United States Patent
Osorio Lozano et al.

(10) Patent No.: US 12,061,702 B2
(45) Date of Patent: Aug. 13, 2024

(54) IDENTITY AND ROOT KEYS DERIVATION SCHEME FOR EMBEDDED DEVICES

(71) Applicant: Google LLC, Mountain View, CA (US)

(72) Inventors: Miguel Angel Osorio Lozano, El Dorado Hills, CA (US); Timothy Jay Chen, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 485 days.

(21) Appl. No.: 17/495,719

(22) Filed: Oct. 6, 2021

(65) Prior Publication Data

US 2022/0108018 A1    Apr. 7, 2022

Related U.S. Application Data

(60) Provisional application No. 63/088,756, filed on Oct. 7, 2020.

(51) Int. Cl.
*H04L 9/08* (2006.01)
*G06F 9/4401* (2018.01)
(Continued)

(52) U.S. Cl.
CPC .......... *G06F 21/575* (2013.01); *G06F 9/4403* (2013.01); *H04L 9/0838* (2013.01);
(Continued)

(58) Field of Classification Search
CPC ...... G06F 21/57; G06F 21/575; G06F 21/572; G06F 9/4403; H04L 9/08; H04L 9/0838;
(Continued)

(56) References Cited

U.S. PATENT DOCUMENTS 9,479,331 B2 * 10/2016 de Cesare ............... G06F 21/00
10,853,519 B2 * 12/2020 Pan ......................... G06F 21/71
(Continued)

FOREIGN PATENT DOCUMENTS

CN          102752635        10/2012

OTHER PUBLICATIONS

Schaller, et al., "Physically unclonable functions found in standard PC components", D3.1 Scientific contribution of WP3, part 1 Use Cases, Sep. 2013, 58 pages.

*Primary Examiner* — Shaqueal D Wade-Wright
(74) *Attorney, Agent, or Firm* — Colby Nipper PLLC

(57) ABSTRACT

This document describes systems and techniques for deriving identity and root keys for embedded systems. In aspects, a boot process and key manager of an embedded system may implement a secure or trusted boot process for embedded systems in which code of next-level boot loader or software image is verified using root keys or other protected information before execution of the boot process is passed to the next stage in the boot process. Alternatively or additionally, the key manager may enable sealing and attestation of various levels of root and identity keys to enable respective verification of software or hardware throughout a life cycle of a device to prevent unauthorized access to protected or private code of an embedded system. By so doing, the described aspects may enable an embedded system with a secure boot process and robust identity and root key management system.

20 Claims, 9 Drawing Sheets

(51) Int. Cl.
*G06F 21/57* (2013.01)
*H04L 9/30* (2006.01)
*H04L 9/32* (2006.01)

(52) U.S. Cl.
CPC .......... *H04L 9/0866* (2013.01); *H04L 9/0894* (2013.01); *H04L 9/30* (2013.01); *H04L 9/3226* (2013.01); *G06F 2221/034* (2013.01)

(58) Field of Classification Search
CPC . H04L 9/0894; H04L 9/30; H04L 9/32; H04L 9/3226; H04L 63/12; H04L 63/06
See application file for complete search history.

(56) References Cited

U.S. PATENT DOCUMENTS

| | | | |
|---|---|---|---|
| 2007/0192610 A1* | 8/2007 | Chun .................... | G06F 21/575 713/176 |
| 2012/0321078 A1 | 12/2012 | Chambers et al. | |
| 2014/0093074 A1 | 4/2014 | Gotze et al. | |
| 2014/0195807 A1 | 7/2014 | Bar-El et al. | |
| 2017/0039352 A1* | 2/2017 | Volkening ............... | G06F 21/57 |
| 2021/0312057 A1* | 10/2021 | Kloth ..................... | G06F 3/0623 |
| 2023/0342476 A1* | 10/2023 | Ziecik ................. | G06F 9/45512 |

* cited by examiner

IDENTITY AND ROOT KEYS DERIVATION SCHEME FOR EMBEDDED DEVICES

RELATED APPLICATION

This application claims priority under 35 U.S.C. § 119(e) to U.S. Provisional Patent Application No. 63/088,756, filed Oct. 7, 2020, the disclosure of which is incorporated by reference herein in its entirety.

BACKGROUND

Embedded devices often utilize complex execution processes involving multiple software layers above boot code of an embedded device. Further, embedded devices may execute software from multiple parties, such as software from a silicon designer and software from a device manufacturer. To protect against the execution of unauthorized software, embedded devices may perform various checks to ensure the authenticity of software within the complex execution process. These checks may involve the use of encryption keys that can be used to protect or validate software within the execution process. As such, embedded devices may implement complex validation processes with various encryption keys. These encryption keys must be managed and protected during the boot process to prevent malicious actors from accessing the encryption keys, which may compromise a secure boot process or result in validation of unauthorized software.

SUMMARY

This document discloses systems and methods for deriving identity and root keys for embedded systems, which may enable secure or trusted boot processes for the embedded systems. In some aspects, a method is described that executes code from a boot read-only memory (ROM) of an integrated circuit (e.g., embedded system or system-on-chip) to implement a boot process for the integrated circuit or a device in which the integrated circuit is embodied. Executing the code of the ROM retrieves a silicon-specific key from the ROM, which can be used to verify a digest of code from a ROM extension image stored in non-volatile memory of the integrated circuit before execution of the ROM extension image. Execution of the ROM extension retrieves a root key of the integrated circuit and a unique device identifier from one-time programmable (OTP) memory of the integrated circuit. Additionally, a description of the code stored in non-volatile memory may be provided by software and used in combination with the root key and device identifier to generate a silicon-specific root key. The silicon-specific root key can be used to generate a silicon-specific (e.g., silicon creator or designer) identity key for signing certificates that endorse the authenticity of the silicon, the ROM, and/or the code from non-volatile memory. Control of the device may then be transferred to allow execution of the code from the ROM extension image stored in non-volatile memory to continue a boot process of the integrated circuit.

In aspects, the boot process may initiate execution of the code of the ROM extension image and retrieve a digest of a bootloader image. A software binding value may be determined based on a manifest of the bootloader image to ensure an intermediate device-specific root key is only generated for a trusted configuration of the code of the bootloader image. Further, control of the boot process may be transferred to the bootloader image, which may initiate the execution of the code of the bootloader image. The boot process may include determining a device-specific (e.g., silicon owner) identity key based on the intermediate device-specific root key. Software binding may then be performed on a digest of code of a kernel image based on the kernel manifest. A device-specific root key may be generated in response to verifying the digest of code from the kernel image, the device-specific root key useful by a kernel implemented by executing the kernel image or applications associated with the trusted kernel.

In yet other aspects, a key manager may provide for sealing and attestation of intermediate device-specific root keys, device-specific identity keys, and/or device-specific root keys through one or more parallel key derivation schemes. In some cases, the sealing key derivation schemes may be based on a static identity of the embedded device, such that the derived keys are static across code updates. Alternatively or additionally, the attestation key derivation scheme may be based on an updated version of the code to be executed from the bootloader and the code from the kernel, such that derived keys enable verification of updated software and a static configuration of hardware on which the software of the embedded system executes.

This Summary is provided to introduce simplified concepts for deriving identity and root keys for embedded systems. The simplified concepts are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of deriving identity and root keys for embedded systems are described below. The use of the same reference numbers in different instances in the description and the figures indicate similar elements.

DETAILED DESCRIPTION

Figure 1:
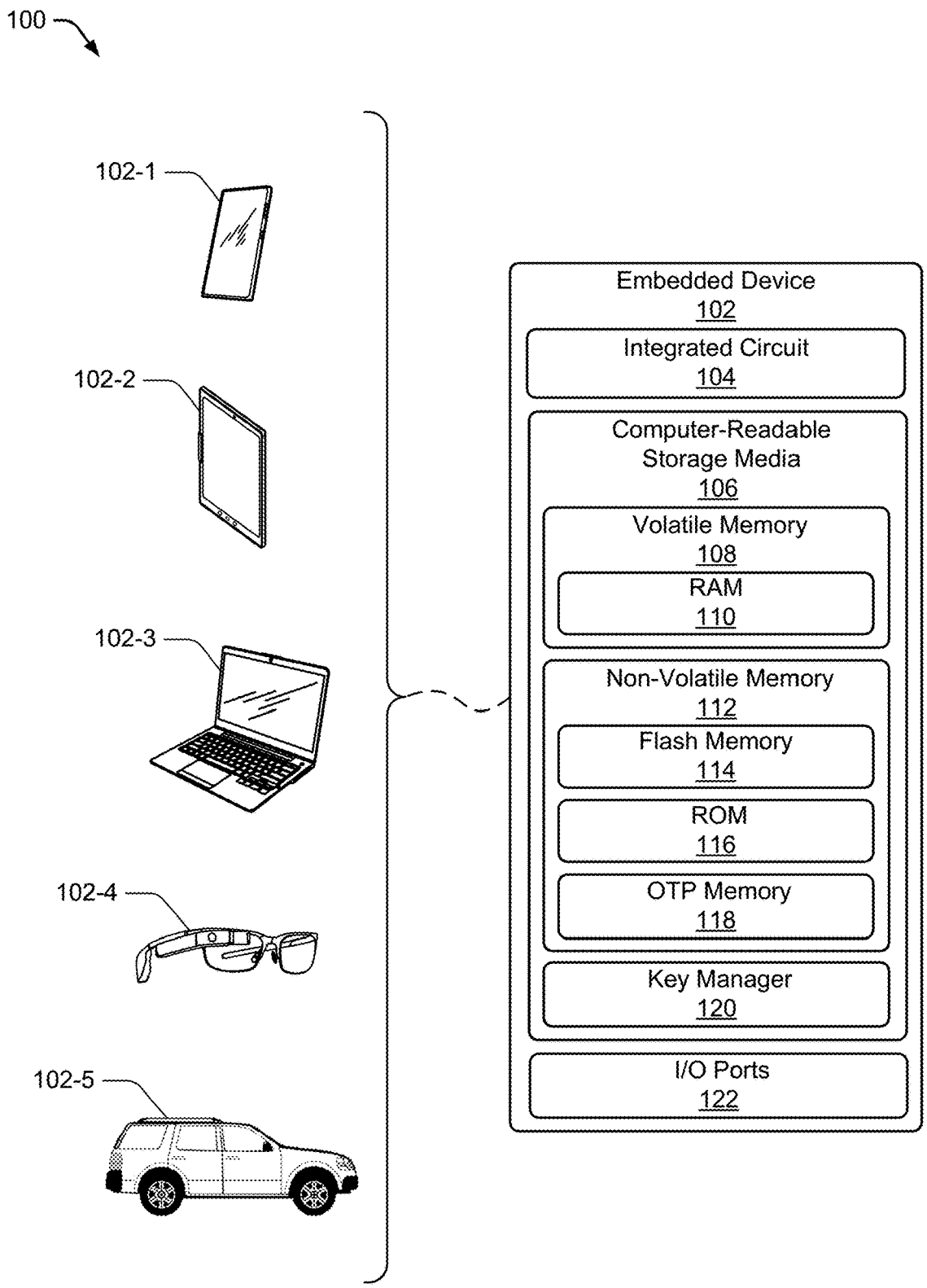
FIG. 1 illustrates an example operating environment in which deriving identity and root keys can be implemented.

This disclosure describes aspects of deriving identity and root keys for embedded systems, which may enable secure or trusted boot processes for the embedded system. The described systems and methods are capable of generating a cryptographic identity or other keys for a device, such as an embedded device, system-on-chip, or other computing devices. In aspects, the cryptographic identity may be coupled to a device life cycle and a software configuration of the device. Additionally, the systems and methods may assign a device-specific cryptographic identity and support the generation of new cryptographic identities as the device and integrated circuit (IC) on which the device is based change ownership through IC or devices manufacturing processes. As discussed herein, these systems and methods provide various implementation details that may further secure against various types of physical level attacks by malicious actors attempting to gain access to software of the device or embedded system.

In some aspects, the described systems and methods are implemented in an SoC (System-on-Chip) embedded in a computing device. Additionally, the systems and methods may support a root of trust (RoT) area of a boot process and an operating system of the computing device. In some cases, the described systems and methods may support running multiple applications in the RoT, with each application having its own identity and associated set of cryptographic keys. To do so, a key manager of the SoC may implement separate key domains when deriving identity and root keys for the embedded system.

In some aspects, a boot process and key manager may generate or derive silicon-specific and device-specific cryptographic identities and a device-specific root key. The key manager may be implemented as a symmetric key manager to implement the described identity and root key processes or schemes with support for software binding and key versioning. The described aspects may also define a non-cryptographic device identifier to facilitate silicon tracking during the manufacturing process. Further, the device identifier may be used in combination with a root key and a description of code stored in non-volatile memory to generate a silicon-specific root key. This silicon-specific root key can be used to determine a silicon-specific identity key and an intermediate device-specific identity key. Based on the intermediate device-specific key, the key manager can generate a device-specific identity key and a device-specific root key. In aspects, the described systems and methods are applicable to secure chip design projects with open-source hardware and software specifications.

The described systems and methods may apply respective versions to keys for version tracking of an embedded system. When generating a key, the key manager may associate a version with that key, such that future versions of the key can preclude previous versions of software from accessing the key. The systems and methods may also support a design lifecycle management (e.g., life cycle state (LCS) value) to provision certain root secrets at the selected times or stages of device manufacture.

In some aspects, these root secrets are isolated from the software to further protect against key extraction attacks by malicious actors. In some cases, the root secrets are encoded into gates within the silicon (e.g., device) at the time of manufacturing, with other root secrets selectively provisioned into fuses (e.g., one-time programmable devices) and embedded flash (e.g., non-volatile memory) within the silicon. This use of different technologies to store different root keys in separate components can help mitigate or prevent key extraction attacks.

As described herein, the systems and methods may use a cryptographic operation to combine the multiple root secrets in a cryptographically safe manner, which may prevent exposure of the root secrets. Additionally, the described aspects may implement software binding to prevent execution of unauthorized software or key access by requiring a software configuration to be validated against a trusted software configuration to allow the cryptographic operation to generate or expose a key through software. These are but a few example aspects of deriving identities and root keys for embedded systems, others of which are described throughout this disclosure and illustrated in the accompanying figures.

Operating Environment

FIG. 1 illustrates an example operating environment 100 for deriving identity and root keys for embedded systems in accordance with one or more aspects. For example, identity and root key derivation may be performed by components of an embedded device 102 such as a mobile device 102-1, a tablet 102-2, a personal computer 102-3, a wearable computing device 102-4, or a vehicle 102-5. Although not shown, other configuration of an embedded device 102 is considered such as a desktop, a server, a printer, a digital camera, a gaming console, a home automation terminal, a mobile hotspot and the like.

In aspects, an embedded device 102 capable of implementing aspects of deriving identity and root keys includes an integrated circuit 104 and computer-readable storage media 106. The computer-readable storage media 106 may be implemented within or in association with the integrated circuit 104, for example, as a system-on-chip or other form of an internal or embedded system that provides processing or functionalities of the embedded device 102. Alternatively, the computer-readable storage media 106 may be external but associated with the integrated circuit 104. The computer-readable storage media 106 include volatile memory 108 and non-volatile memory 112, which may include any suitable type, combination, or number of internal or external memory devices. Each memory of the computer-readable storage media 106 may be implemented as an on-chip memory of hardware circuitry or an off-chip memory device that communicates data with the integrated circuit 104 via a data interface or bus. In one example, volatile memory 108 includes random access memory 110 (RAM 110). Alternatively, or additionally, volatile memory 108 may include other types of memory, such as static random access memory (SRAM), synchronous dynamic random access memory (DRAM), asynchronous DRAM, double-data-rate RAM (DDR), and the like.

Further, non-volatile memory 112 may include flash memory 114, read-only memory (ROM 116) 116, and one-time programmable (OTP) memory 118, each of which may be partitioned into portions or segments for storing different code images, manifests, and so forth. Other non-volatile memory not shown may include non-volatile RAM (NVRAM), electronically-erasable programmable ROM, embedded multimedia card (eMMC) devices, single-level cell (SLC) flash memory, multi-level cell (MLC) flash memory, and the like. In one example, ROM 116 and OTP memory 118 are implemented as on-chip memory areas. Boot code may be stored in one or more non-volatile memory components, such as flash memory 114 and ROM 116. In a specific example, the lowest-level of boot code or boot-ROM code is written or masked in ROM 116. By doing so, the boot code in the ROM 116, or the metal-mask ROM/boot-ROM, cannot be modified after the chip is manufactured. The non-modifiable nature of ROM 116 provides an assurance of authenticity in the boot-ROM. Higher-level boot code can be implemented in extensions of the ROM 116, such as flash memory 114.

In aspects, boot code may be written to OTP memory 118, which is capable of being written to only once. OTP memory 118 includes blocks of fuses which represent a settable binary value. Specifically, to write data into OTP memory 118 appropriate fuses are burned from their default state (e.g., zero) to their non-default state (e.g., one) or vice versa. As such, once a fuse is burned to its non-default state, the fuse is no longer usable to write other data to the OTP memory 118. After finalized, the contents of OTP memory 118 may be locked by burning any unused fuses.

The embedded device 102 may execute operating systems or applications from any suitable type of computer-readable storage media 106 including volatile memory 108 and non-volatile memory 112. Alternatively or additionally, operating systems or applications may be embodied as firmware or any other computer-readable instructions, binaries, or code. The embedded device 102 may include a user interface provided by operating systems or applications to allow specific functionality or services of the embedded device 102.

Computer-readable storage media 106 may also include a key manager 120 which may be implemented through machine-readable instructions executable by the embedded device 102. The key manager 120 may be used to generate, retrieve and store keys specific to the embedded device 102. As such, the key manager 120 may be implemented through any combination of hardware, software, or firmware. Further, the key manager 120 may be configured to perform comparisons between one or more keys to allow execution of one or more portions of the computer-readable memory 106.

The embedded device 102 may also include I/O ports 122. I/O ports 122 may allow the embedded device 102 to interact with other devices or users, such as the programming of code or values described herein to respective memories, registers, and so forth. I/O ports 122 may include any combination of internal or external ports, such as USB ports, Joint Test Action Group (JTAG) port, Test Access and Programming (TAP) port, audio ports, Serial ATA (SATA) ports, PCI-express based ports or card-slots, secure digital input/output (SDIO) slots, and/or other legacy ports. Various peripherals may be operatively coupled with I/O ports 122, such as human-input devices (HIDs), external computer-readable storage media, or other peripherals.

Boot Architecture

Figure 2:
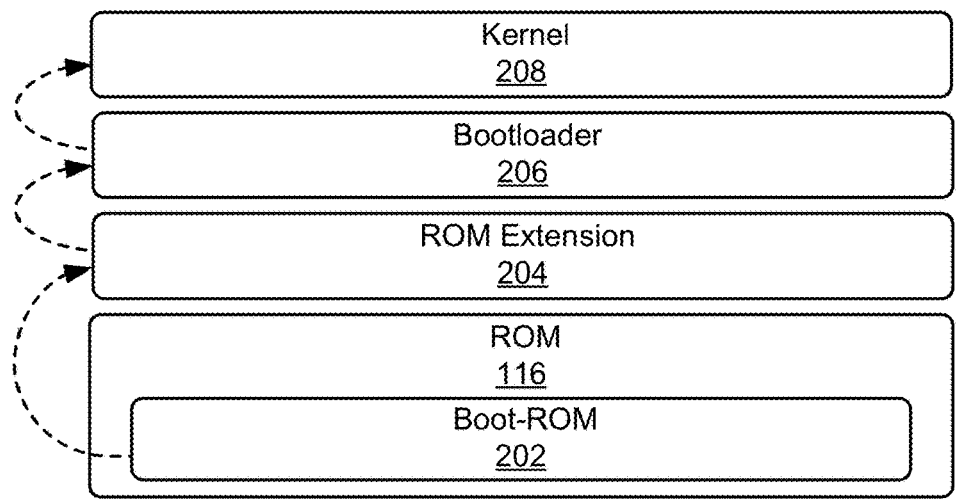
FIG. 2 illustrates an example boot architecture for an embedded device in accordance with one or more aspects.

FIG. 2 illustrates an example boot architecture 200 of an embedded device in accordance with one or more aspects. The boot architecture 200 may include one or more stages such as ROM 116, ROM extension 204, bootloader 206, and kernel 208. The stages may be divided under device ownership such that the ROM 116 and ROM extension 204 are within the creator stage where the silicon is owned and controlled by a silicon creator or silicon designer. Similarly, the bootloader 206 and the kernel 208 may be within an owner stage where the silicon is owned and controlled by a silicon owner, device owner, or system integrator. In aspects, the silicon owner stage supports two stages, the bootloader 206 and the kernel 208. Alternatively, the silicon owner may choose other configurations within the silicon owner stage. In aspects, the ROM 116 includes Boot-ROM 202, a binary of boot code burned during manufacture of ROM 116. Boot-ROM 202 may be executed to initiate the boot process of the embedded device. Due to the unmodifiable nature of Boot-ROM 202 in that it is burned to ROM 116, Boot-ROM 202 is a trusted boot process and may function as a "root of trust" or RoT boot process. Once execution of the Boot-ROM 202 is complete, the boot process may advance to ROM extension 204 or higher-level boot code.

In aspects, the ROM extension 204 may function as an extension of the ROM 116 implemented as a ROM extension image stored within or executed from a non-volatile memory (e.g., flash memory 114). For example, the silicon creator may determine additional code needs to be executed to provision the silicon in an appropriate manner for transfer to the silicon owner. As such, code may be updated within ROM extension 204 to be executed before transfer to the silicon owner stage of the boot process. Due to the updatable nature of ROM extension 204, it may not ensure authenticity in the same manner as Boot-ROM 202. As such, it may be necessary to verify the authenticity of the ROM extension 204 before execution. In aspects, the ROM 116 may be configured to verify the authenticity of the ROM extension 204 before transferring control of the device for execution of the ROM extension 204 by verifying a hash or a cryptographic identifier of the ROM extension 204. In some aspects, verifying a hash of all code within the ROM extension 204 may be computationally expensive. In some situations, it may be appropriate to verify a hash tree of portions of the code within the ROM extension 204. By authenticating the ROM extension 204, a chain of trust may be established from the "root of trust" to a next step of the boot process.

Further, the execution of ROM extension 204 may transfer control of the embedded device to the silicon owner stage of the boot process. The bootloader 206 may be used to prompt the execution of higher-level software. In an aspect, the bootloader 206 is implemented as a bootloader 206 image stored within non-volatile memory (e.g., flash memory 114). In a similar manner to how Boot-ROM 202 may be used to authenticate ROM extension 204, ROM extension 204 may be used to attest to the authenticity of code from the bootloader 206 by verifying a cryptographic identifier or hash of code associated with the bootloader 206. Code from the bootloader 206 image may be identified within a boot information page (boot info page). By verifying the bootloader, the ROM extension 204 may ensure the next sequence of the boot process is secure and continue the chain of trust through execution of the bootloader 206.

The boot process may continue to execution of the kernel 208 at which device functionality may be provided to the user or processing capabilities enabled for applications of the device. In an aspect, the kernel 208 is implemented as a kernel 208 image stored within non-volatile memory (e.g., flash memory 114). Again, the kernel 208 may be verified by the previous stage of the boot process such that the bootloader 206 ensures the security of the kernel 208. Verification may take place by verifying a cryptographic identifier or hash of the kernel 208. In doing so, the chain of trust may be extended to the termination of the boot process to ensure security of the boot in its entirety.

In aspects, validation of higher-level software via a lower-level process may be performed as part of a secure or RoT boot process. The secure boot process may include using a public key to verify a signature of a digest of higher-level code. For example, a creator public key may be used to validate a signature of a digest of code stored within the ROM extension 204. Similarly, an owner public key may be used to validate a signature of a digest of code associated with the bootloader 206 or kernel 208. Alternatively, or in addition, the owner public key may be used to validate a signature of a digest of code stored within the ROM extension 204. The public keys described herein are provided by way of example only and a public key of any stage of the RoT process may reference or include a public key provided by a silicon creator, a silicon designer, a silicon owner, a system/device integrator, or the like. The secure boot process may also require the digest of code from the higher-level stage to be validated against the higher-level stage manifest. For example, a hash or cryptographic identifier may be used to compare a digest of code associated with the bootloader 206 to a bootloader manifest at the ROM extension 204 stage. Similarly, a hash or cryptographic identifier may be used to compare a digest of code associated with the kernel 208 to a kernel manifest at the bootloader 206 stage. In an aspect, the manifest of a stage stores metadata indicative of a trusted configuration of code at that stage. The secure boot process may also be used to write a maximum version key from the manifest of a stage to a key manager register. The secure boot process may also allow a software binding value to be retrieved from a manifest of a stage when a digest of code is verified against the manifest.

Identity and Root Key Derivation

Figure 3:
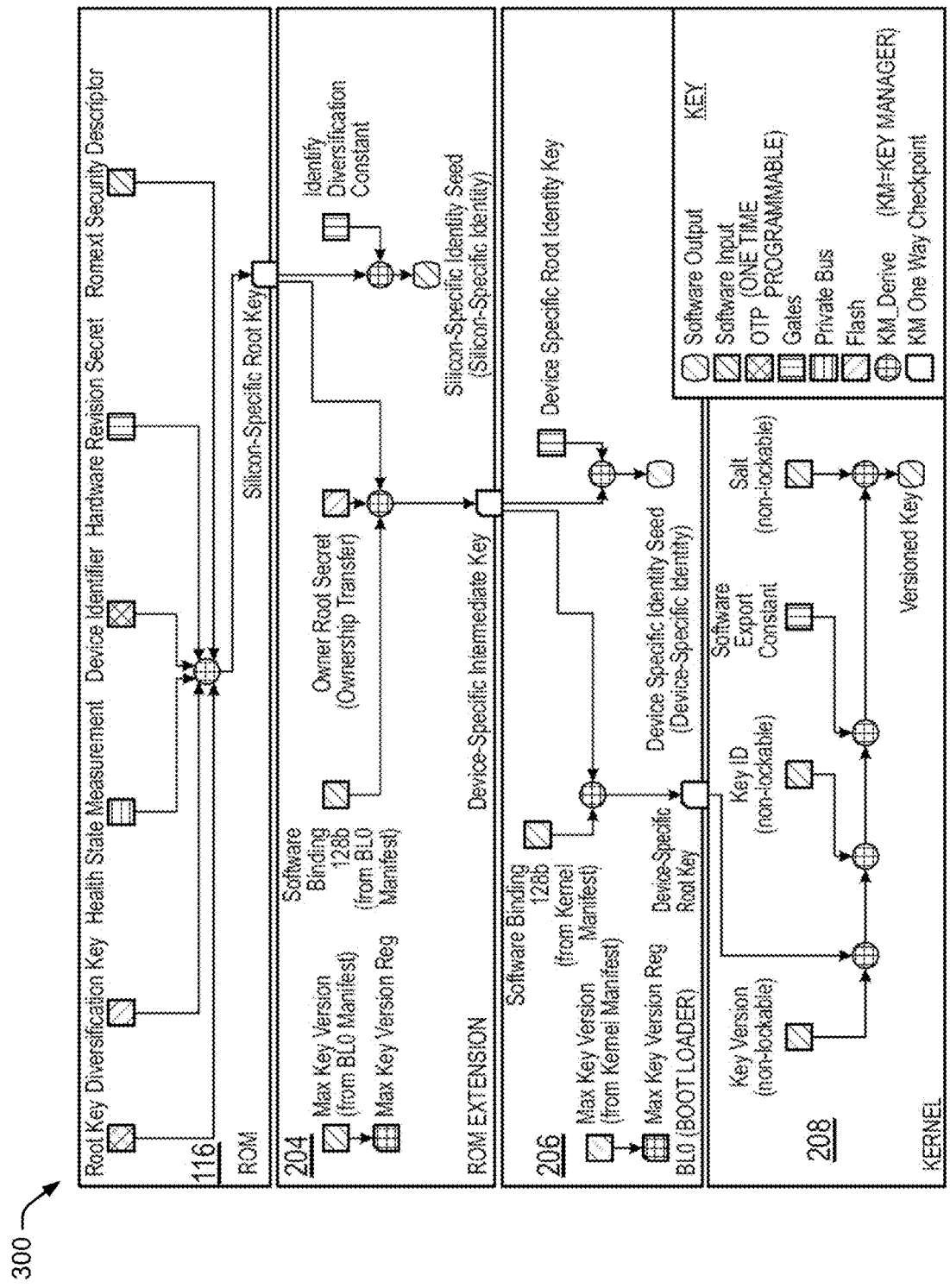
FIG. 3 illustrates an example scheme for deriving identity and root keys for an embedded device.

FIG. 3 illustrates an example derivation scheme 300 for deriving identity and root keys for embedded systems, which includes four boot stages: ROM 116, ROM extension 204, bootloader 206 (BL0 206), and kernel 208. These four boot stages or layers may distinguish activities of the silicon owner and the silicon creator. For example, the ROM 116 and ROM extension 204 stages may be included in a silicon creator stage, while the BL0 206 and kernel 208 stages may be included in a silicon owner stage. The ROM 116 stage may refer to a metal-mask ROM, which is also referred to as a Boot-ROM (e.g., Boot-ROM 202). A ROM extension 204 boot stage may be stored in memory (e.g., flash memory 114) and signed by the silicon creator. For example, the silicon creator may endorse the ROM extension 204 with the silicon creator public key infrastructure (PKI). The silicon creator is a logical entity, or a logical collection of entities, that manufactures, packages, tests, and provisions the chip with its first identity. BL0 206, or other bootloader layer not illustrated in this example, may be signed by the silicon owner. Similarly, the kernel 208 may also be signed by the silicon owner. For example, the silicon owner may endorse the bootloader 206 and kernel 208 with the silicon owner PKI. The silicon owner is a logical entity or entities allowed to sign code for execution, as well as to sign ownership management commands. The four boot stages: ROM 116, ROM extension 204, bootloader 206 (BL0 206), and kernel 208 are discussed in greater detail herein.

In aspect, a key manager performs various operations, such as KM_Derive, which is a one-way function used to derive a new symmetric key. KM_Derive may use one or more cryptographic operations to combine the multiple root secrets or other values in a cryptographically safe manner. These operations may include logical operations, comparators, concatenation or any other cryptographically safe operation. The key manager may also prompt operations related to a memory state, for example, Clear_Before_Next_Boot_Stage, which clears key material before continuing to the next boot stage, and Clear_After_Use, which clears the memory immediately after use. In an aspect, the key manager may perform Clear_Before_Next_Boot_Stage at transfer from the ROM extension to the bootloader to protect the silicon creator secrets from the silicon owner stages.

In some aspects, a secure boot policy manages various key derivation operations. Specifically, the first software component executing on the device will verify a next boot stage, extract the key manager identification for the next boot stage, and program it into the key manager. The boot process then continues to the next boot stage. For example, a boot process may begin with restriction to the ROM 116 to execute the ROM 116 and verify the ROM extension 204. The ROM extension 204 may be loaded into an active boot slot and validated via the silicon creator public key stored in ROM which may be used to verify the signature of the ROM extension 204 payload digest. After validating the ROM extension 204, execution may be transferred to the ROM extension 204. This process continues until the kernel 208 is reached. At the kernel 208, there is a key output function that allows the setting of application identifiers.

As shown in FIG. 3, the example ROM 116 stage identifies a RootKey, a DiversificationKey, a HealthStateMeasurement, a DeviceIdentifier, a HardwareRevisionSecret, a ROMExtSecurityDescriptor, and a CreatorRootKey. The DeviceIdentifier may be a globally unique 256b value provisioned on each device's OTP (one-time programmable) memory in early manufacturing stages (e.g., wafer test). This identifier may be used to facilitate device tracking during manufacturing and provisioning. Alternatively or additionally, this value can be also used as a component in the generation of the device's Silicon-Specific Identity, a cryptographically unique identity.

In some implementations, the 256b value is split into two halves or another number of equal or unequal portions. The first half may contain hardware origin information following a global standard format, while the second half may be defined by the device stock-keeping unit (SKU) provisioning requirements. Table 1 identifies example hardware origin information in accordance with one or more aspects.

128b Hardware Origin Information

TABLE 1

| No. Bits | Description |
|---|---|
| 16 | silicon creator identifier. Assigned by the OpenTitan project. |
| 16 | Product identifier. Assigned by the silicon creator. Used to identify a class of devices. |
| 64 | Individual device identification number. Assigned by the silicon creator. For example, the wafer lot number and the X, Y coordinates of the die may be encoded here to simplify manufacturing tracking. Another option is to use a non-cryptographic hash function with collision checks to guarantee global uniqueness. |
| 32 | CRC-32 IEEE 802.3. covering the previous bytes. |

128b SKU Specific Device Information

The device provisioner information may vary for each provisioning use case. Each use case may have a specification defining the allocation of these bits. The following sequence describes the creation of the SiliconSpecific-RootKey. All inputs into the key manager can be locked down during ROM 116 execution. The size of the inputs may be dependent on the security strength and masking configuration of the implementation. Depending on the KM_DERIVE intrinsic function, one of the following two mixing operations can be used as described herein.

In a cascading implementation, a new key can be derived from the previous key and a single root secret. In some cases, the new key is used as the previous key for an additional key derived from an additional root secret. The process may be repeated until all root secrets have been used to generate a key. The last key generated may represent the SiliconSpecificRootKey. For example, the following code block 1 describes a possible cascading implementation for deriving the SiliconSpecificRootKey.

---
Code Block 1

Key0 = KM_DERIVE(RootKey, DiversificationKey)
Key1 = KM_DERIVE(Key0, HealthStateMeasurement)
Key2 = KM_DERIVE(Key1, DeviceIdentifier)

---

Specifically, the SiliconSpecificRootKey may be derived through one or more cryptographic operations to combine the multiple root secrets in a cryptographically safe manner. While a single example configuration of root secrets is shown, it should be noted that the SiliconSpecificRootKey may be derived by any combination, in whole or in part, of the above-mentioned root secrets. Moreover, additional root secrets describing the silicon may be used to derive the SiliconSpecificRootKey using the techniques described above. For example, the SiliconSpecificRootKey may be derived through combination of the RootKey, the DeviceIdentifier, and the ROMExtSecurityDescriptor.

Table 2 identifies example details regarding keys, descriptors, and other information shown in ROM 116 of FIG. 3.

TABLE 2

| Name | Encoding | Description |
| --- | --- | --- |
| RootKey | OTP | Device root key. Provisioned at manufacturing time by the silicon creator. Hidden from software once personalization is complete. |
| DiversificationKey | Flash | Additional diversification key stored in flash. Provisioned at manufacturing time by the silicon creator. Hidden from software once provisioned. |
| ROM Ext Security Descriptor | SW register | The implementation may choose one of the following options:<br>1. Hash of the ROM extension. Changes in the ROM extension code will trigger an update of the Silicon-Specific Identity.<br>2. Use a software binding tag stored in the ROM_EXT manifest. This is to retain the Silicon-Specific Identity across validated updates of the ROM_EXT.<br>The implementation may opt to use the software binding interface described herein to fulfill this property. |
| Device Identifier | OTP | Provisioned at manufacturing time. Readable from software and Joint Test Action Group (JTAG) interface. |
| Hardware Revision Secret | Gates | Encoded in gates. Provisioned by silicon creator before tapeout. Hidden from software. |
| Health State Measurement | Register (ROM stage) | Device life cycle state.<br>Debug mode state.<br>ROM Hash.<br>Some values are read from the device lifecycle controller. The device life cycle state should be consumed by the ROM 116 stage.<br>The debug mode may be used as well if there are multiple debug configurations supported by a single lifecycle state. |

---
-continued

Code Block 1

Key3 = KM_DERIVE(Key2, ROMExtSecurityDescriptor)
SiliconSpecificRootKey = KM_DERIVE(Key3, HardwareRevisionSecret)

---

Alternatively, in a collapsed implementation, the concatenation function may be injective. This can be achieved by fixing the width of all the operands. For example, the following code block 2 describes a possible collapsed implementation for deriving the SiliconSpecificRootKey.

---
Code Block 2

SiliconSpecificRootKey = KM_DERIVE(RootKey,
    DiversificationKey | HealthStateMeasurement | DeviceIdentifier |
    ROMExtSecurityDescriptor | HardwareRevisionSecret)

---

The RootKey may be an identification key provisioned at the manufacturing time by the silicon creator and/or encoded in OTP memory and hidden from software to ensure security. The DiversificationKey may be a constant provisioned at the time of manufacturing and hidden from software to ensure security. The DiversificationKey may also be stored in flash memory. The ROM Ext Security Descriptor may be a hash of the ROM extension. In this case, changes in the ROM extension 204 may trigger an update of the SiliconSpecificRootKey. Alternatively, the ROM Ext Security Descriptor may be a software binding value stored in the ROM extension 204 manifest. In this case, the SiliconSpecificRootKey may be constant across updates of the ROM extension 204.

In aspects, the Hardware Revision Secret may be implemented in logical circuitry on the integrated circuit. For example, the Hardware Revision Secret may provide an indication of the hardware revision performed on the integrated circuit (e.g., burned fuses). The Health State Measurement may include a device life cycle state, a debug mode state, or a ROM Hash. In some cases, the Health State Measurement is a monotonically increasing or decreasing value indicative of one or more measurements described herein. In an aspect, the Health State Measurement includes a device life cycle state provided by a device life cycle controller. The device life cycle state may include a manufacturing state, indicating the presence of debug functions and a manufacturing testing status. This state may correspond to a greater visibility in the boot process to be used to debug the system. Alternatively, the device life cycle state may include an Identity and Ownership state. This state may correspond to the identity and root key derivation scheme of this disclosure when the device has been manufactured and is implemented.

The SiliconSpecificRootKey can be used to generate the Silicon-Specific Identity key described herein. In aspects, the Silicon-Specific Identity may be an asymmetric key derived from the SiliconSpecificRootKey. It may be used as a cryptographic identifier bound to the silicon and the silicon creator. The Silicon-Specific Identity may be used to attest to the authenticity of the silicon and the ROM 116 and ROM extension 204 configurations. In one example, the Silicon-Specific Identity may be generated as follows in code block 3.

Code Block 3

```
SiliconSpecificIdentitySeed =
    KM_DERIVE(SiliconSpecificRootKey, IdentityDiversificationConstant)
// ASYM_KDF is a KDF function compliant to the Asymmetric Key
// requirements defined in the Attestation specification document.
SiliconSpecificIdentity_Private = ASYM_KDF(SiliconSpecificIdentitySeed)
CLEAR_BEFORE_NEXT_BOOT_STAGE(SiliconSpecificIdentitySeed,
SiliconSpecificIdentity_Private)
```

Table 3 identifies example details regarding keys, descriptors, and other information shown in ROM extension 204 stage of FIG. 3.

TABLE 3

| Name | Encoding | Description |
| --- | --- | --- |
| Identity Diversification Constant | Gates | A constant defined in gates. Used to derive the SiliconSpecificIdentitySeed from the SiliconSpecificRootKey. Hidden from software. |
| Creator Identity Seed | SW Register Output | Seed used to generate the Silicon-Specific Identity asymmetric key. |

Specifically, the SiliconSpecificRootKey may be combined with an IdentityDiversificationConstant encoded in logical circuitry within the integrated circuit. In an aspect, the IdentityDiversificationConstant is a silicon manufacturing key provisioned at the time the silicon is manufactured. This may produce a SiliconSpecificIdentity Seed which, when provided to the key derivation function (KDF), produces a Silicon-Specific Identity. The Silicon-Specific Identity may include a private asymmetric key. In an aspect, the Silicon-Specific Identity may be used to sign certificates attesting to the authenticity of the silicon and the ROM 116 and ROM extension 204 configurations. The private portion of the Silicon-Specific Identity and SiliconSpecificIdentity-Seed may be cleared from memory before transferring execution from the ROM extension 204 to the first silicon owner stage (e.g., BL0 206) to protect the silicon creator secrets from the silicon owner stage.

Additionally, the SiliconSpecificRootKey can be used to generate the DeviceSpecificIntermediateKey as described herein. The SiliconSpecificRootKey is used as a root component of the device-specific key hierarchy. It is used to establish a cryptographic link to the root secrets provisioned at manufacturing time. In some aspects, the DeviceSpecificIntermediateKey may be kept hidden from software to mitigate owner impersonation attacks. The DeviceSpecificIntermediateKey may be generated as follows in code block 4:

Code Block 4

```
DeviceSpecificIntermediateKey =
    KM_DERIVE(SiliconSpecificRootKey, OwnerRootSecret |
    SoftwareBindingValue)
```

Table 4 identifies example details regarding keys, descriptors, and other information shown in BL0 stage 206 of FIG. 1 in accordance with one or more aspects.

TABLE 4

| Name | Encoding | Description |
| --- | --- | --- |
| Owner Root Secret | Flash | Used as a diversification constant with acceptable entropy. Provisioned at Ownership Transfer time by the silicon creator. The OwnerRootSecret has different visibility options depending on the level of isolation provided in hardware: The value should be hidden from software after provisioning. The value is visible to ROM and ROM Extension, but hidden from all silicon owner software. The ROM Extension implements this property. |
| SoftwareBinding Value | SW Register Lockable Input | Software binding value configured during secure boot. |

In an aspect, the SiliconSpecificRootKey can be used to generate the DeviceSpecificIntermediateKey through combination with the Owner Root Secret and a software binding value determined from the BL0 206 manifest. Software binding may be used to ensure that the key derivation scheme is only reproducible for a trusted software configuration. This may be achieved by having the secure boot implementation configure runtime-irrevocable binding tags in the key derivation scheme. Such tags are usually delivered inside the signed manifest of each code partition. As a result, the signature of each manifest may need to be verified. In an aspect, the signature of each manifest may be verified with a proper PKI (e.g., silicon owner PKI for silicon owner stage). Further, a software binding value may be determined from the BL0 206 manifest by verifying a hash or cryptographic identifier of a digest of the BL0 206 during execution of the ROM extension 204. In some aspects, the described techniques may support software binding for at least two silicon owner code stages (e.g., bootloader and kernel). In some implementations, the kernel may implement binding with the application layer exclusively in software. Alternatively, or in addition, software binding may require at least 128b of data. Once the DeviceSpecificIntermediateKey is derived, a one-way step function may be performed to ensure the security of a higher-level boot process stage. For example, the DeviceSpecificIntermediateKey may be checked against a symmetric key and, if validated, initiate execution of the BL0 206 stage.

In aspects, the DeviceSpecificIntermediateKey may be used to generate the Device-Specific Identity, a cryptographic identifier bound to the device and the silicon owner. It may be used to attest to the authenticity of the software identity of the device and the BL0 206 configuration. For example, an attestation request may be received by the key manager at the BL0 206 stage of the boot process. In response, the Device-Specific Identity may be generated from the DeviceSpecificIntermediateKey. The Device-Specific Identity may be used to sign a certificate that attests to the authenticity of the BL0 206 configuration. In some implementations, the Device-Specific Identity does not change during the lifetime of the device ownership assignment. The Device-Specific Identity may be generated as follows in code block 5:

---
Code Block 5
---

```
DeviceSpecificIdentitySeed =
   KM_DERIVE(DeviceSpecificIntermediateKey,
   DeviceSpecificRootIdentityKey)
// ASYM_KDF is a KDF function compliant to the Asymmetric Key
// requirements defined in the Attestation specification document.
DeviceSpecificIdentity_Private =
ASYM_KDF(DeviceSpecificIdentitySeed)
CLEAR_BEFORE_NEXT_BOOT_STAGE(DeviceSpecificRootSeed,
DeviceSpecificIdentity_Private)
```

Table 5 identifies additional details regarding keys, descriptors, and other information shown in BL0 stage 206 of FIG. 3 in accordance with one or more aspects.

TABLE 5

| Name | Encoding | Description |
|---|---|---|
| Device Specific Root Identity Key | Gates | The DeviceSpecificRootIdentityKey is a diversification constant with acceptable entropy provisioned in gates. Visibility: Hidden from software. |
| Device Specific Identity Seed | SW Register Output | Seed used to generate the DeviceSpecificIdentity asymmetric key. |

Accordingly, the DeviceSpecificIntermediateKey can be used to generate the DeviceSpecificIdentitySeed using the DeviceSpecificRootIdentityKey. In an aspect, the DeviceSpecificRootIdentityKey is a value with acceptable entropy hidden from software and encoded in logical circuitry within the integrated circuit. As a result, the DeviceSpecificIdentitySeed may be better mitigate security attacks. The DeviceSpecificIdentitySeed may be input into a KDF to create the Device-Specific Identity Private Key. The Device-Specific Identity Private Key may be used to attest to the authenticity of the BL0 206 configuration by signing certificates. Further, the Device-Specific Identity Private Key may be used to attest to the authenticity of the boot process before kernel 208 execution. Before execution is handed over to the kernel 208, the DeviceSpecificIdentitySeed and the private portion of the Device-Specific Identity may be cleared to protect the lower-level software secrets from higher-level software. In doing so, the possibility of security attacks may be minimized.

In various aspects, the key manager may support the generation of versioned keys with lineage to a DeviceSpecificRootKey for software consumption and sideload operations. Additionally, the DeviceSpecificIntermediateKey may be used to generate the DeviceSpecificRootKey as described herein. The DeviceSpecificIntermediateKey may be combined with a software binding value determined from the kernel 208 manifest. For example, during execution of the BL0 206, a software binding value may be determined from the kernel 208 manifest by verifying a hash or cryptographic identifier of a digest of the kernel 208. In aspects, the cryptographic identifier may include the use of the silicon owner PKI to endorse the digest of the kernel 208. The software binding value may be stored within the kernel 208 manifest. As a result, software binding may ensure that the DeviceSpecificRootKey is only generated for a trusted configuration of the kernel 208. For example, the following code block 6 illustrates an example cascading derivation of the VersionedKey from the DeviceSpecificIntermediateKey.

---
Code Block 6
---

```
DeviceSpecificRootKey =
   KM_DERIVE(DeviceSpecificIntermediateKey, SoftwareBindingValue)
Key0 = KM_DERIVE(DeviceSpecificRootKey, KeyVersion)
Key1 = KM_DERIVE(Key0, KeyID)
Key2 = KM_DERIVE(Key1, Salt)
VersionedKey = KM_DERIVE(Key2, SoftwareExportConstant)
CLEAR_AFTER_USE(VersionedKey)
```

Alternatively, the versioned keys may be generated in a collapsed derivation. If the implementation allows it, the version keys may be derived through an injective concatenation function with fixed-width operands as follows.

---
Code Block 7
---

```
DeviceSpecificRootKey =
   KM_DERIVE(DeviceSpecificIntermediateKey, SoftwareBindingValue)
VersionedKey = KM_DERIVE(DeviceSpecificRootKey,
   KeyVersion | KeyID | Salt | SoftwareExportConstant)
```

Table 6 identifies additional example details regarding keys, descriptors, and other information shown in Kernel stage 208 of FIG. 3 in accordance with one or more aspects.

TABLE 6

| Name | Encoding | Description |
| --- | --- | --- |
| DeviceSpecificRootKey | Internal RAM | Owner Root Key bound to the software stack. Visibility: Hidden from software. |
| SoftwareBindingValue | SW Register Lockable Input | Software binding value configured during secure boot. |
| KeyVersion | SW Register Input | Key version. The value provided by software may be mixed with a gate constant before key derivation steps. The value should also pass the version comparison criteria configured during secure boot. |
| KeyID | SW Register Input | Key identifier. Used to derive a VersionedKey from VersionedRootKey. Processing of this field should provide countermeasures against key recovery attacks. |
| SoftwareExport Constant | Gates | The SoftwareExportConstant is a diversification constant with acceptable entropy provisioned in gates. It is used to mitigate key recovery attacks on software inputs. Visibility: Hidden from software. |
| Salt | SW Register Input | Salt input controlled by software. |
| VersionedKey | SW Register Output/ Private Bus Sideload | Output key derived from VersionedRootKey and KeyID. Support for sideloading may require additional support in the key manager, otherwise the software will be in charge of enforcing isolation. |

In aspects, the SiliconSpecificRootKey, DeviceSpecificIntermediateKey, and/or DeviceSpecificRootKey may be used as a one-way checkpoint in the boot process. For example, the key manager may perform a comparison of an expected SiliconSpecificRootKey to the derived SiliconSpecificRootKey to determine the validity of the derived SiliconSpecificRootKey at the ROM 116 stage. If the derived SiliconSpecificRootKey is determined valid, the boot process may progress to the ROM extension 204 stage. Similarly, validity checks of the DeviceSpecificIntermediateKey may be performed at the ROM extension 204 stage. The derived DeviceSpecificIntermediateKey may be checked against an expected DeviceSpecificIntermediateKey. If the derived key is deemed valid, the boot process may continue to the BL0 206 stage where the derived DeviceSpecificRootKey is validated against an expected DeviceSpecificRootKey. In an aspect, validation of the DeviceSpecificRootKey progresses the boot process to the kernel 208 stage. If at any stage the derived key is deemed invalid, the boot process may be disabled and/or a security component of the embedded system may be alerted.

Alternatively or additionally, any of the derived keys described, such as the SiliconSpecificRootKey, the DeviceSpecificIntermediateKey, and/or the DeviceSpecificRootKey, may be versioned using key versioning as described herein. Generally, key versioning may include a mechanism by which software implements key rotation triggered by security updates or software changes. Because there may be more than one updatable code partition in the system, a key versioning scheme may implement at least eight 32b version comparators with lockable controls, which may be configured as part of the secure boot process. For example, key versioning may include the determination of a DeviceSpecificRootKey for each update to the kernel 208 configuration. In an aspect, the key versions will include a first version, second version, and all other versions up to a most current version of the respective stage configuration.

As another example, FIG. 3 demonstrates key versioning of the DeviceSpecificRootKey using a KeyVersion, a KeyID, and salt. It should be noted that while key versioning is only shown for the DeviceSpecificRootKey, key versioning is acceptable at any stage of the boot process through similar methods. In an aspect, each of the SiliconSpecificRootKey, DeviceSpecificIntermediateKey, and DeviceSpecificRootKey are versioned using key versioning. When a security update is triggered, each phase of the boot process may configure a maximum key version from an expected key at that stage. For example, a maximum key version may be configured from the key generated from a most recent update of the respective phase of the boot process. Alternatively, one or more phases of the boot process may configure multiple maximum key versions.

Figure 4:
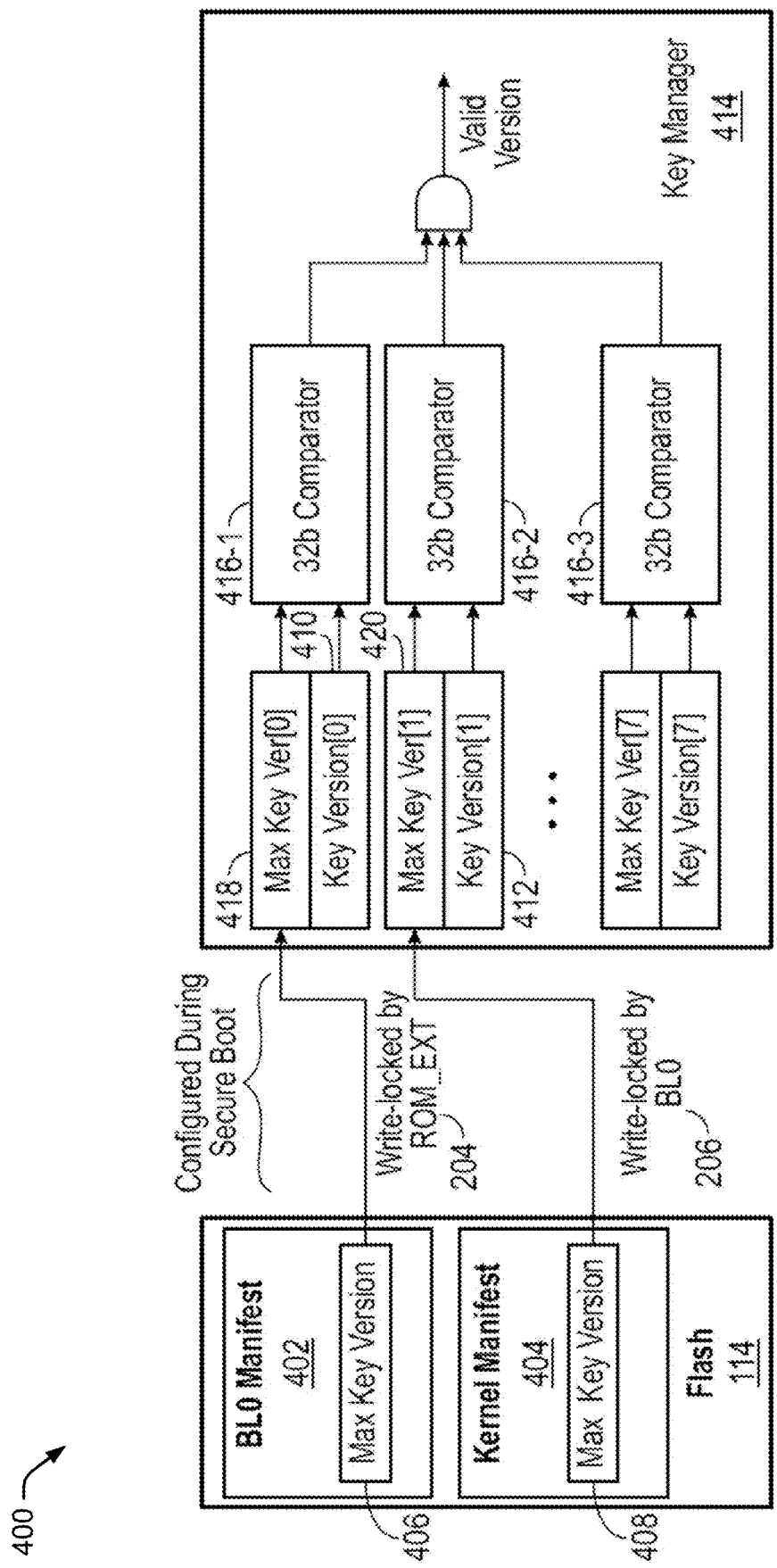
FIG. 4 illustrates an example configuration of a key manager and a memory that provides maximum key version constraints in accordance with one or more aspects.

FIG. 4 illustrates an example configuration 400 of a key manager and a memory that provides maximum key version constraints in accordance with one or more aspects. In the example configuration 400, the ROM extension 204 write-locks a first register 418 of a key manager 414. The ROM extension 204 verifies a BL0 manifest 402 stored in flash memory 114 through the secure boot process and configures the first register 418 with the max key version 406 stored in the BL0 manifest 402. In an aspect, the max key version 406 stores a versioned key representative of software to be executed in the BL0 206 stage. For example, the maximum allowable version 406 may store the expected DeviceSpecificIntermediateKey of a most recent update to the BL0 206 stage. As part of the write process, the ROM extension may verify the BL0 manifest 402 through software binding in accordance with the secure boot process. For example, the ROM extension 204 may validate the signature of the digest of the BL0 206 using the silicon owner Public Key stored in the boot info page. Once the max version key 406 is written to the first register 418, the versioned key 410 may be verified against the maximum allowable version 406. In an aspect, the versioned key 410 is the DeviceSpecificIntermediateKey derived from the SiliconSpecificRootKey and the software binding value is retrieved from the BL0 manifest 402 through the secure boot process. The key manager may utilize a 32b comparator 416-1 to validate the versioned key 410. Additionally, security updates within the BL0 206 stage may cause a change in the max key version 406. Thus, previously acceptable versions of the versioned key 410 may be determined as invalid. In an aspect, if the versioned key 410 is determined valid by the key manager 414, the boot process may continue. Alternatively, if the versioned key 410 is determined invalid by the key manager 414, the boot process will be disabled. It should be noted that while the BL0 manifest is only shown to configure one max version key into a single register of the key manager, each phase of the boot process may configure multiple max version keys into multiple registers.

In the same way, the BL0 206 stage verifies the Kernel manifest 404 stored in flash memory 114 through the secure boot process. In doing so, the max version key 408 is written to a separate key version register 420 of the key manager 414. In an aspect, the max version key 408 is the expected DeviceSpecificRootKey derived from the most recent update of the kernel (e.g., kernel 208) stage. The versioned key 412 may be validated against the max version key 420 using a 32b comparator 416-2. In an aspect, the versioned key 412 is the derived DeviceSpecificRootKey. If validated, the boot process may continue to the execution of the kernel (e.g., kernel 208) stage. Note that FIG. 4 is overly simplified and does not take into account security hardening, which may be implemented in addition to the aspects described. Additionally, because multiple portions of the boot process allow for updatable code partitions, the key versioning scheme may have to implement at least 8 32b comparators 416-3 with lockable controls.

Key Consumption

Figure 5:
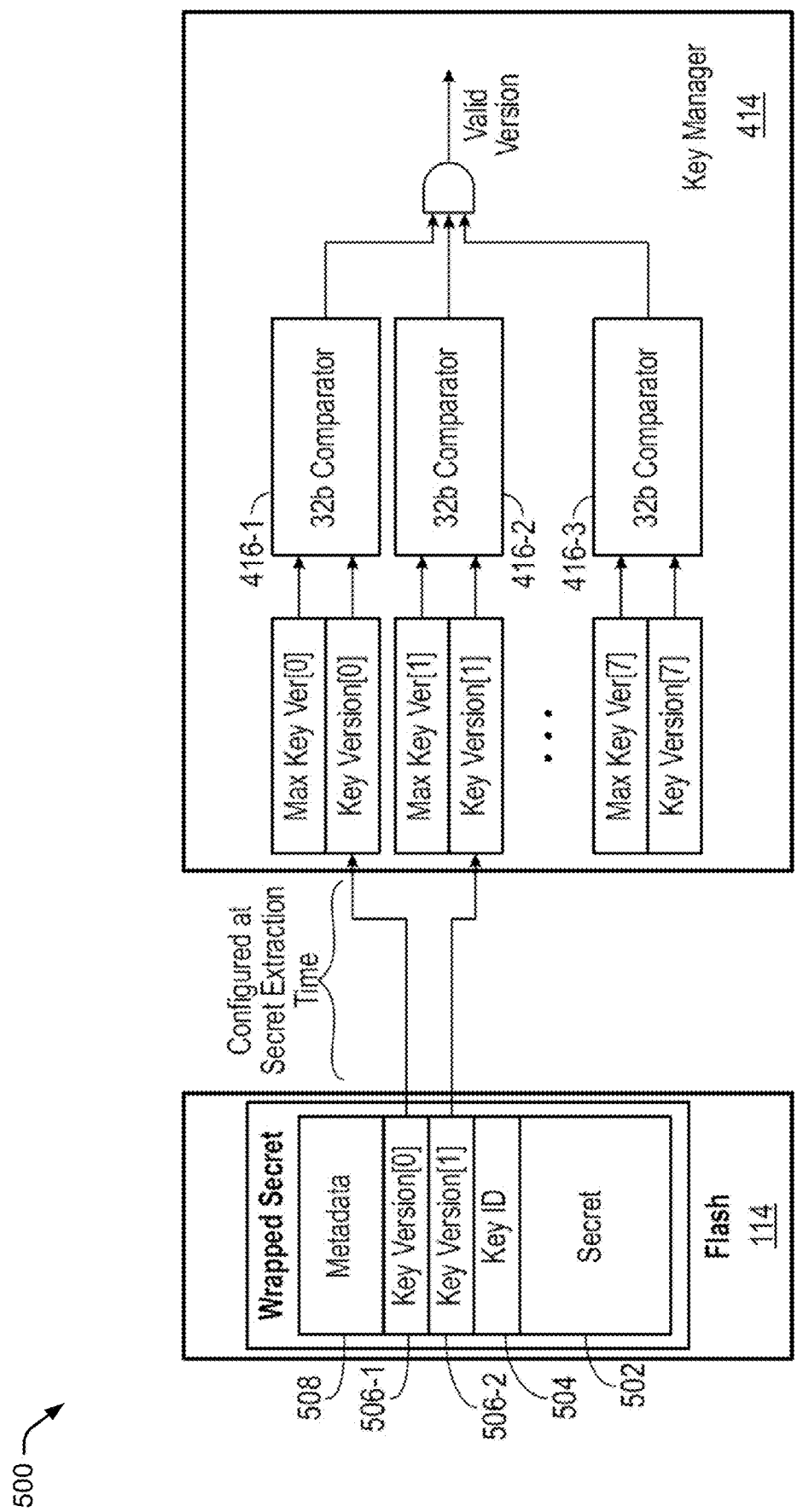
FIG. 5 illustrates an example configuration of the key manager and a memory that provides various key version settings in accordance with one or more aspects.

FIG. 5 illustrates an example configuration 500 of the key manager and a memory that provides various key version settings in accordance with one or more aspects. For example, a secret 502 may be wrapped with versioned keys 506 (e.g., versioned key 506-1 and versioned key 506-2 and stored in flash memory 114. The secret 502 may be wrapped with additional metadata 508 including Key Version, Key ID 504, and salt information. The versioned key generation is gated on the version comparison check enforced by the key manager implementation. The set of operations shown in FIG. 3 may only succeed if the key version set by the software is valid. Note that FIG. 3 is overly simplified and does not take into account security hardening, which may be implemented in addition to the aspects described.

Figure 6:
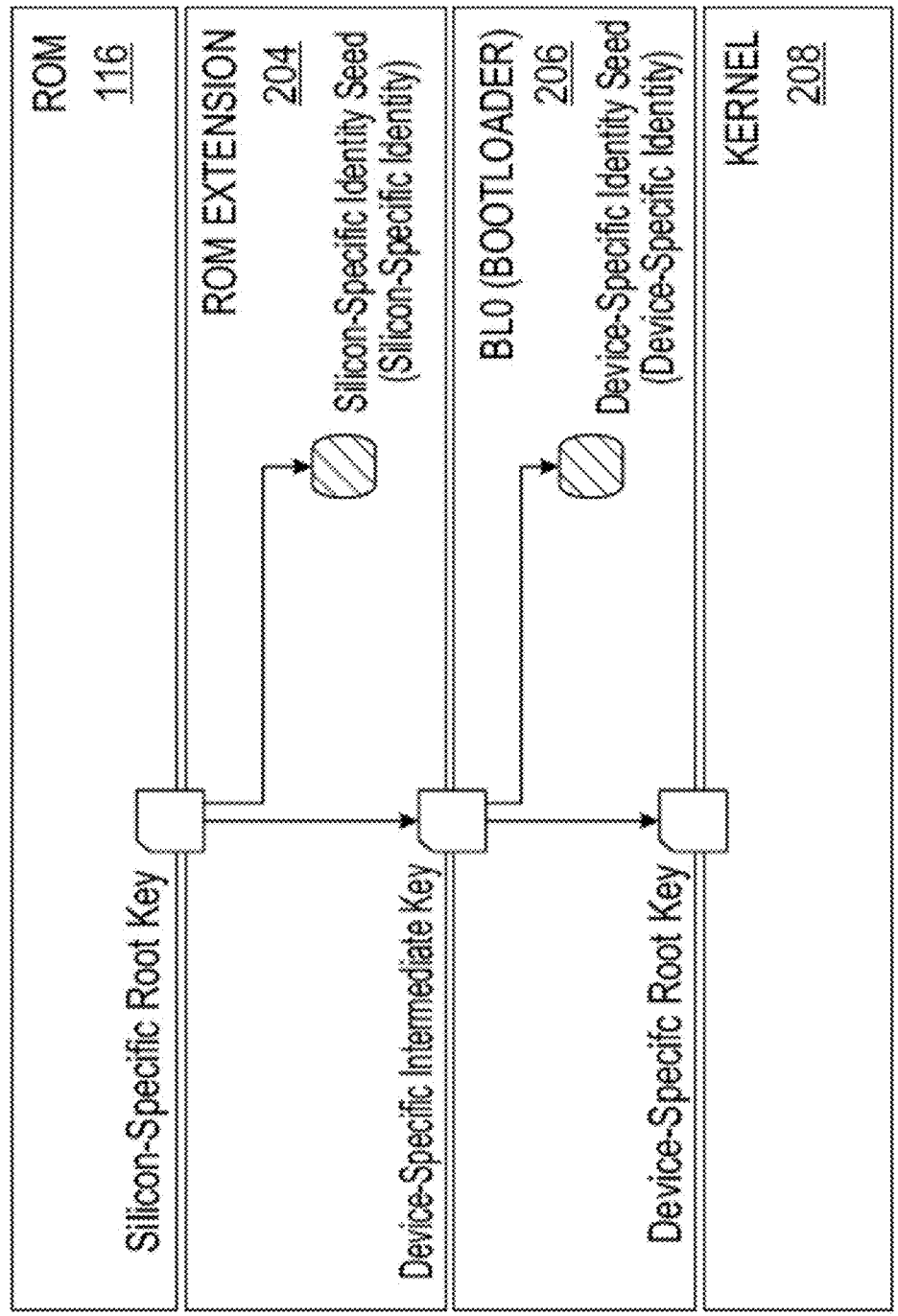
FIG. 6 illustrates an example configuration of boot process layers with a set of one-way step functions in accordance with various aspects.

FIG. 6 illustrates an example configuration 600 of boot process layers with a set of one-way step functions in accordance with various aspects. In some cases, the example configuration represents a minimum set of high-level one-way step functions used when implementing aspects described herein. For example, recommendations for programming model abstraction may include high-level key manager states. In the example 600, the high-level one-way step functions take place at the ROM 116, the ROM extension 204, the BL0 206, and the kernel 208. The hardware may opt to implement a software interface with higher-level one-way step functions to advance the internal state of the key manager. For example, the kernel 208 may implement one-way step functions within a higher-level application layer exclusively in software. In order to reach the kernel 208 state, the minimum high-level step functions may be required. Additionally, FIG. 6 shows the minimum set of steps that may be required. The minimum steps may include: the creation of the SiliconSpecificRootKey, the generation of the DeviceSpecificIntermediateKey, and the generation of the DeviceSpecificRootKey, as described in this publication. In addition, it may be required that the Silicon-Specific Identity and Device-Specific Identity be derived for use in attestation.

In some aspects, instantiations of the key manager can be conditioned to start at the current internal state of the key manager. In this aspect, respective levels of the software may be executed from the farthest trusted key derivation in the RoT. For example, kernel-level instantiations may always start at the OwnerRootKey level, assuming the previous boot stages advanced the state of the key manager.

Figure 7:
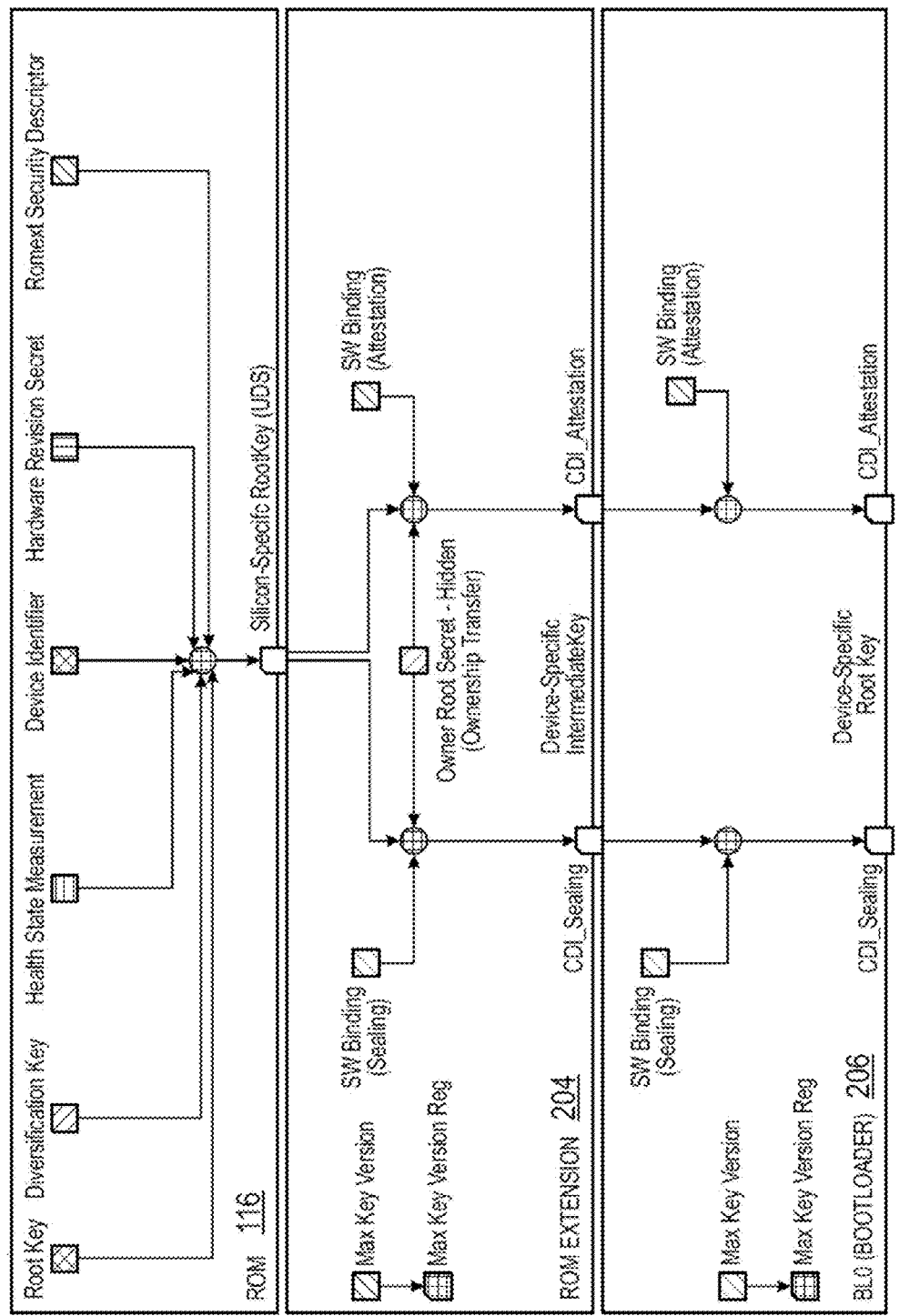
FIG. 7 illustrates an example of parallel attestation and sealing for identity and root keys in accordance with one or more aspects.

FIG. 7 illustrates at 700 an example of parallel attestation and sealing for identity and root keys in accordance with one or more aspects. In some cases, an identity and root keys derivation scheme is implemented with parallel sealing and attestation flows as described with reference to FIG. 7. While a single identity and root keys derivation flow may be required to satisfy attestation requirements of the SoC device, parallel identity and root keys derivation flows may be performed for use in attestation and sealing. Sealing flows may be used to seal software such that it may only be accessed by a specific device at a specific stage of the boot process. Due to the updatable nature of one or more stages of the boot process, it may be beneficial for the sealing flow to be based on the static identity of a device. Accordingly, sealing flows may be constant across software updates and changes in the configuration of boot stages. In contrast, attestation is used to attest to the authenticity of a device in a current configuration or state. As a result, the attestation keys may vary across updates and reflect the current configuration of the device. Given the separate requirements of each flow, a separate but parallel sealing and attestation flow may be beneficial in some implementations.

The example 700 details an attestation flow and sealing flow for the identity and root keys derivation techniques described within this document. For example, a boot process includes the ROM 116, the ROM extension 204, the BL0 206, and the kernel (not shown). Like in the single flow example, a SiliconSpecificRootKey may be derived in the ROM 116 stage from the RootKey, the DiversificationKey, the HealthStateMeasurment, the DeviceIdentifier, the HardwareRevisionSecret, and the ROMExtSecurityDescriptor. Once again, the SiliconSpecificRootKey may be derived, in whole or in part, through any combination of the above-listed root secrets, any other root secret, and the KM_Derive function. For example, the SiliconSpecificRootKey may be derived from the RootKey, the DeviceIdentifier, and the ROMExtSecurityDescriptor through the KM_Derive function. In an aspect, the SiliconSpecificRootKey is derived similarly for single flow and multiple flow (e.g., attestation and sealing flows) identity and root keys derivation.

Once the SiliconSpecificRootKey has been derived, a check may be performed to validate the SiliconSpecificRootKey before handing over execution to the ROM extension 204. If validated, the ROM 116 may hand over control of the SoC to the ROM extension 204. At transfer of ownership from the silicon creator to the silicon owner, an Owner Root Secret may be provisioned. The Owner Root Secret may again be used to separate the silicon owner stages from the silicon creator stages. For example, the attestation flow begins from the SiliconSpecificRootKey. During execution of the ROM extension 204, an Owner Public key may be retrieved from the boot info page of the BL0 206 and used to validate a signature of a digest of updated code from the BL0 206. If validated, the digest of updated code from the BL0 206 may be compared against a BL0 206 manifest. In an aspect, the comparison includes a hash of the codes or a cryptographic identifier associated with the codes. Once validated, a software binding value can be retrieved from the BL0 206 manifest and input to the key manager. Specifically, the software binding value is related to the code that has been updated. The key manager may use the KM_Derive function to combine the software binding value and the SiliconSpecificRootKey to derive an attestation DeviceSpecificIntermediateKey. Moreover, the KM-Derive function may utilize an Owner Root Secret, provisioned at transfer time from the silicon creator to the silicon owner. The Owner Root Secret is a value that may be used to alter the SiliconSpecificRootKey to separate the keys generated in the silicon owner stages from the silicon creator stages. During execution of the ROM extension 204 phase, a maximum key version may be written to a register of the key manager from the BL0 206 manifest to be used in a comparison to the derived attestation DeviceSpecificIntermediateKey. Further, the attestation DeviceSpecificIntermediateKey may be used in the attestation process. For example, if an attestation request is received, the attestation DeviceSpecificIntermediateKey may be used to create the attestation Device-Specific Identity, which may be used to attest to the authenticity of the BL0 206 configuration.

Similarly, the sealing flow may begin from the SiliconSpecificRootKey. During execution of the ROM extension 204, an Owner Public key may again be retrieved from the boot info page of the BL0 206 but used to validate a signature of a digest of the original code from the BL0 206. In an aspect, the original code is a first version of the code from the BL0 206. If validated, the digest of the original code from the BL0 206 may be compared against a BL0 206 manifest. The comparison may again include a hash of the codes or a cryptographic identifier associated with the codes. Once validated, a software binding value can be retrieved from the BL0 206 manifest and input into the key manager. Specifically, the software binding value is related to the code that has not been updated (e.g., the original code). The key manager may use the KM_Derive function to combine the software binding value and the SiliconSpecificRoot key to derive a sealing DeviceSpecificIntermediateKey. The KM-Derive function may similarly utilize an Owner Root Secret, provisioned at transfer time from the silicon creator to the silicon owner to alter the SiliconSpecificRootKey to distinguish the keys generated in the silicon owner stages from the silicon creator stages. During execution of the ROM extension 204 phase, a maximum key version may be written to a register of the key manager from the BL0 206 manifest to be used in a comparison to the derived DeviceSpecificIntermediateKey. Further, the sealing DeviceSpecificIntermediateKey may be used to seal software or other computer-readable media, such that it can only be accessed with a same or associated key. For example, the sealing DeviceSpecificIntermediateKey may be used to derive the sealing Device-Specific Identity. This key may be used to seal software such that it can only be accessed by a same device in a same stage.

The attestation flow and sealing flow may continue from their respective DeviceSpecificIntermediateKey during execution of the BL0 206 stage. A software binding value may again be retrieved for updated and original code from the kernel. In this instance, the Owner Public key may again be used to validate a digest for each of the updated and original code from the kernel. A manifest of the original and updated code may be compared to the digest of original and updated code from the kernel. As a result, a software binding value representative of the original code may be retrieved from the kernel manifest for the sealing flow, and a software binding value representative of the updated code may be retrieved from the kernel manifest for the attestation flow. The execution of the BL0 206 stage may include writing a maximum version key from the kernel manifest to a register of the key manager for each of the verified updated and original code. These maximum version keys may be used in comparisons during the attestation and sealing flows, respectively. Further, the respective software binding values may be used to derive the attestation and sealing DeviceSpecificRootKeys.

The process may continue through versioned keys, as shown in the above single flow, for each of the attestation and sealing flows. Further, the attestation flow may be used to attest to the authenticity of the boot process at any stage. For example, the DeviceSpecificRootKey may attest to the authenticity of the kernel configuration just as the DeviceSpecificIntermediateKey may attest to the BL0 206 configuration. Similarly, the sealing flow may be used to seal a computer-readable medium at any stage such that the computer-readable medium may only be accessed by a same device at a same stage.

While the techniques for identity and root keys derivation have been described in relation to certain aspects, other implementations are possible. For example, the Silicon-Specific and Device-Specific identities may be collapsed leaving the Silicon-Specific Identity as the sole identity supported by the platform. This may require the transfer of ownership to support a Certificate Signing Request (CSR) command to be able to endorse the identity by the Owner Public Key Infrastructure (PKI). Alternatively, the techniques may implement a DeviceSpecificRootSecret provisioned at Ownership Transfer time to provide isolation between device owners. In some aspects, the Silicon-Specific and Device-Specific identities can be generated outside the key manager and be completely managed by software. In this situation, the key manager can be used to generate storage wrapping keys for the identity seeds.

Figure 8:
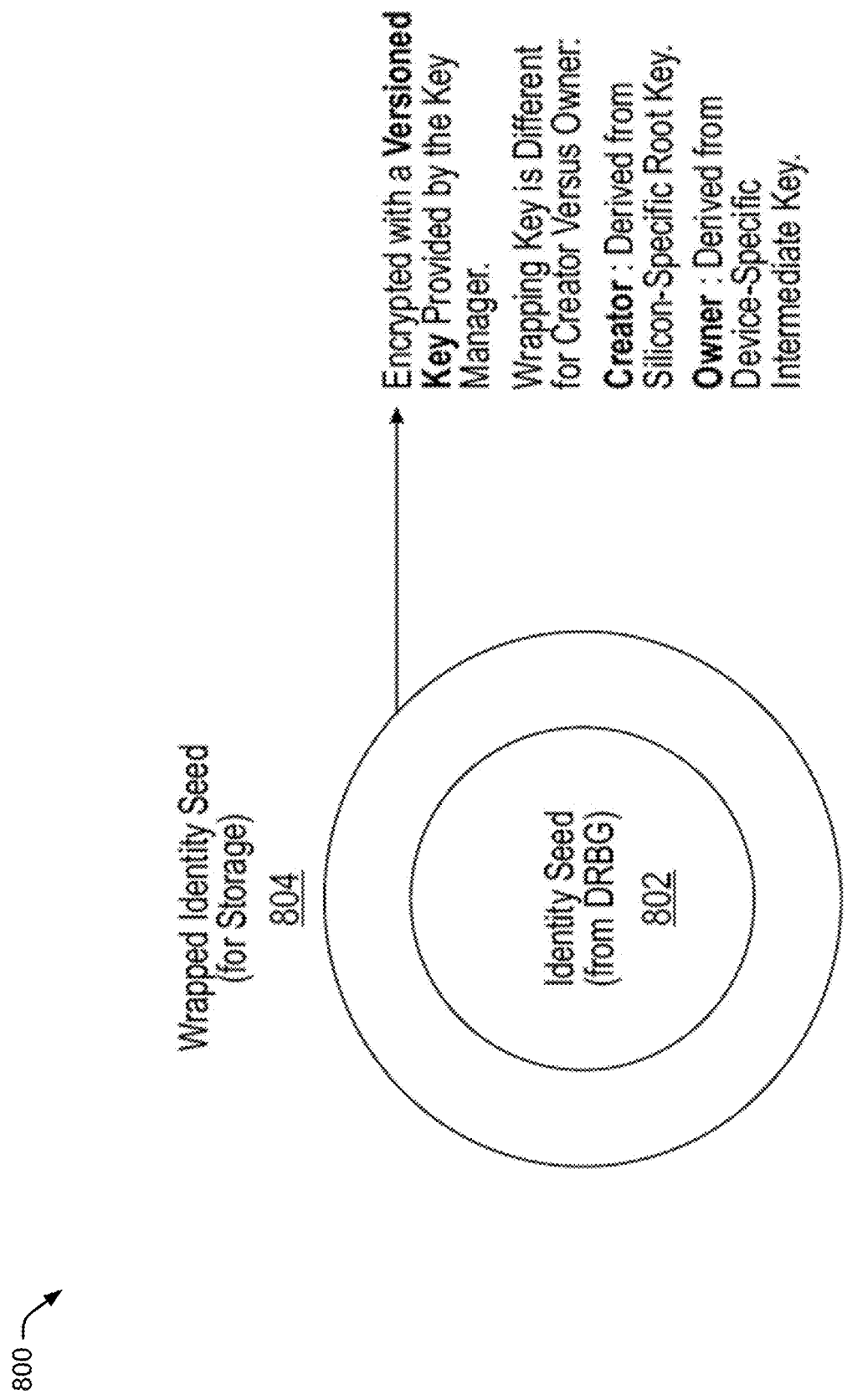
FIG. 8 illustrates an example of identity generation support for keys external to the key manager.

FIG. 8 illustrates at 800 an example of identity generation support for keys external to the key manager. For example, the Identity seed 802 may be wrapped in an appropriate versioned key to produce a Wrapped Identity seed 804. In an aspect, a Silicon-Specific Identity seed may be wrapped in a key generated from the SiliconSpecificRootKey. In other aspects, the Device-Specific Identity seed may be wrapped in a key generated from the DeviceSpecificIntermediateKey. The implementation may require that a same key be used to unwrap the identity seed 802 as the key used to wrap the Identity seed 802. In some aspects, the design includes support for identity states, which forces the mixing of class-level constants (i.e., IdentityDiversificationConstant, DeviceSpecificRootIdentityKey) for each Identity seed 802. This ensures lineage to the RootKey and the Device Identifier. Additional provisioning requirements may have to be considered if the Identity seeds are not derived from the Root Key.

In some situations, the hardware may be required to support more than 256b of software binding data. Additional bits may be added in 256b increments to support more complex software binding schemes. In some aspects, key manager derive functions should support at least 256b of security strength. Other implementations of the KM_DERIVE function may require additional provisioning. For example, the following Tables 7A and 7B describes security strength provisions for the KM_DERIVE function based on a Pseudorandom Function (PRF).

TABLE 7A

| PRF | Security Strength | Notes |
| --- | --- | --- |
| CMAC-AES-256 | 128 | Security strength limited to AES block size. SCA countermeasures for AES are more widely available in literature. |
| HMAC-SHA2-256 | 256 | There are no plans for hardening the OpenTitan HMAC hardware implementation due to complexity. No planned support for HMAC-SHA3. |
| KMAC256 | 256 | Security hardening is under consideration for the OpenTitan KMAC hardware implementation. Need to verify with a lab that the claim for 800-133r2 section 6.3 compliance holds. Certification using a KMAC construction is challenged by the following issues. Common Criteria: 1. Even though SHA-3 is an approved SOG-IS algorithm, KMAC is not[4]. FIPS - NIST specs: 1. NIST 800-56Cr1 lists KMAC as an approved one-step KDF, although the spec is focused on key establishment applications; but, 2. NIST 800-108, which focuses on PRF key derivation functions, does not list KMAC as a primitive. Note however that the document is pretty old. |

Alternatively, the following describes security strength provisions for the KM_DERIVE function based on a Deterministic RNG (DRNG).

TABLE 7B

| PRF | Security Strength | Notes |
| --- | --- | --- |
| CTR-DRBG | 256 | Additional requirements: 1. Factory time provisioned entropy (seed). 2. Hash function required to compress additional data into DRBG (additional_data or perso_string). 3. Global counter to keep track of key derivations (may require device lifetime key manager keygen counter, which can be implemented in software. This can be very difficult since the key derivation paths change per ownership transfer). |

Further, some implementations may require additional provisioning. For example, the hardware may support: countermeasures against key recovery attacks for all software-controlled inputs, at least eight 32b write-lockable version comparison registers to provide key versioning functionality, at least 256b of software write-lockable registers to implement software-hardware key manager binding as part of the secure boot implementation, and versioned key derivations for software provided Key IDs. In aspects, the Key ID is defined as a 256b value used as a key handle. Additional provisioning may require that the hardware may isolate the RootKey and other provisioned secrets from software after completion of personalization at manufacturing time. Further, higher-level boot stages may have no access to secrets maintained by previous boot stages. The software may configure runtime lockable inputs as part of the secure boot implementation to fix the construction of identities and root keys in the key manager. Hardware secrets stored in OTP and flash may be scrambled to increase the difficulty of physical attacks. ROM extension updates may invalidate the silicon owner and silicon creator identities as well as the root keys. Lastly, the implementation may consider a software-based backup mechanism to mitigate security and/or certification issues with the main implementation. The backup mechanism may not rely on secrets from the main implementation.

Example Method

Figure 9:
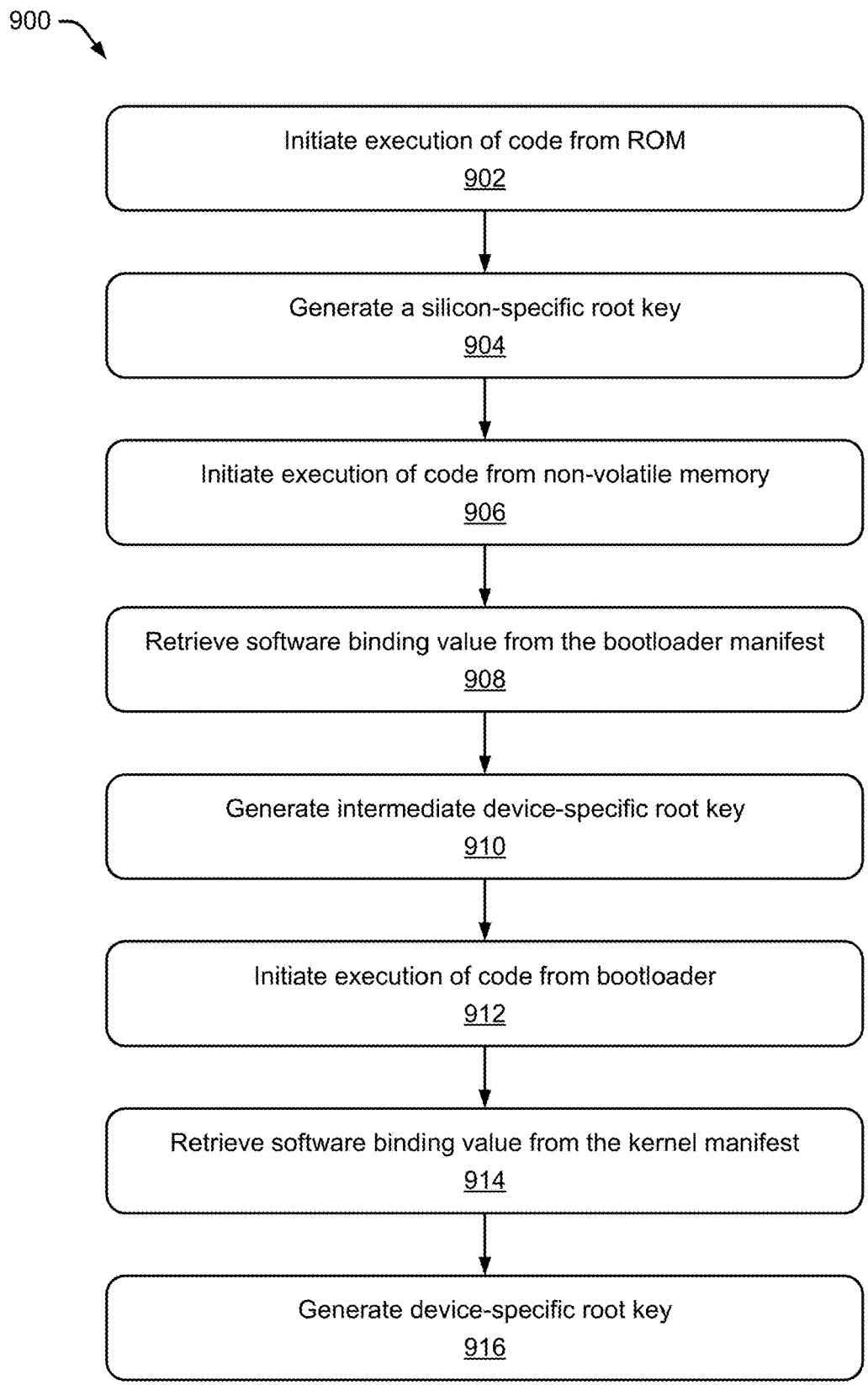
FIG. 9 illustrates an example method of deriving identity and root keys for embedded systems in accordance with one or more aspects.

FIG. 9 depicts an example method 900 for deriving identity and root keys for embedded systems in accordance with one or more aspects. The method 900 is illustrated as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device.

At 902, execution of a code from ROM is initiated. In response to execution of the first code, a Creator Public Key may be received from ROM. Alternatively, an Owner Public Key may be retrieved from the ROM. A digest of code stored in a non-volatile memory of the integrated circuit (e.g., flash memory) is verified. This verification may include the verification of a signature of the digest of code using the Creator Public Key. It may also include verifying a hash or cryptographic identifier of the digest of code. In an aspect, a hash may include a hash of portions of the code if a hash of the full code requires excessive computation. Further, a software binding value may be determined from a non-volatile memory manifest once the digest of code from the non-volatile memory has been verified. A root key and a unique device identifier may be retrieved from OTP memory of the integrated circuit and provided to a key manager with a security descriptor of the second code from a register of the integrated circuit. In an aspect, the security descriptor includes a hash of the digest of code from non-volatile memory or the software binding value from the non-volatile memory manifest.

At 904, a SiliconSpecificRootKey is generated from the root key, a unique device identifier, and the security descriptor. The SiliconSpecificRootKey may optionally be derived through combinations of different inputs including: a hardware revision indicator from logic circuitry of the integrated circuit, an indication of a life cycle state of the integrated circuit via a data bus, or a silicon manufacturing key for the integrated circuit from the non-volatile memory. The SiliciconSpecificRootKey may be used to generate a Silicon-Specific Identity through a KDF.

At 906, execution is initiated for the code from non-volatile memory. Execution may include generation of the Silicon-Specific Identity, the DeviceSpecificIntermediateKey, or both. In an aspect, a digest of code is retrieved from the bootloader based on the boot info page. A signature of the digest of code from the bootloader is verified based on an Owner Public Key from the boot info page. Additionally, the digest of code from the bootloader may be verified against the bootloader manifest and a maximum key version may be written from the bootloader manifest to a register of the key manager. At 908, a software binding value is retrieved from the bootloader manifest and provided to the key manager. At 910, the key manager generates a DeviceSpecificIntermediateKey based on the SiliconSpecificIntermediateKey and the software binding value from the bootloader manifest.

At 912, execution of code from the bootloader is initiated responsive to the successful generation of the DeviceSpecificIntermediateKey. A Device-Specific Identity may be determined based on the DeviceSpecificIntermediate Key using a KDF. Additionally, a digest of code from the kernel may be retrieved and a signature of the digest may be verified using the Owner Public Key. The digest of code from the kernel may be compared to a kernel manifest to verify the security of the code from the kernel. If verified, a maximum key version register of the key manager may be configured with the maximum key version from the kernel manifest.

At 914, a software binding value may be retrieved from the kernel manifest and provided to the key manager. At 916, the key manager may generate a DeviceSpecificRootKey based on the DeviceSpecificIntermediateKey and the software binding value from the kernel manifest. The DeviceSpecificRootKey may be used for all future execution in a software layer of the system. Further, key versioning may be performed at any level of the boot process. Examples of these operations are described above, including those performed by one or more of an integrated circuit, a silicon creator, a silicon owner, or the key manager.

CONCLUSION

Although aspects of the described systems, circuits, and methods have been described in language specific to features and/or methods, the subject of the appended claims is not necessarily limited to the specific features or methods described. Rather, the specific features and methods are disclosed as example implementations of the described techniques, and other equivalent features and methods are intended to be within the scope of the appended claims. Further, various aspects of deriving identities and root keys for embedded systems are described, and it is to be appreciated that each described aspect can be implemented independently or in connection with one or more other described aspects.

What is claimed is:

1. A method for booting an integrated circuit, the method comprising:
   initiating execution of first code from a boot read-only memory (ROM) of the integrated circuit;
   in response to the execution of the first code:
      retrieving a public key from the ROM;
      verifying, based on the public key, a digest of second code of a ROM extension image stored in a non-volatile memory of the integrated circuit;
      retrieving a root key from one-time programmable (OTP) memory of the integrated circuit;
      retrieving a device identifier from the OTP memory of the integrated circuit;
      obtaining a security descriptor of the second code of the ROM extension image; and
      providing the root key, the device identifier, and the security descriptor of the second code to a key manager of the integrated circuit to generate a silicon-specific root key; and
   responsive to verifying the digest of the second code and successful generation of the silicon-specific root key by the key manager, transferring execution from the first code to the second code of the ROM extension image.

2. The method of claim 1, further comprising in response to the execution of the first code:
   retrieving a hardware revision indicator from logic circuitry of the integrated circuit;
   receiving, via a data bus, an indication of a life cycle state of the integrated circuit;
   retrieving a silicon manufacturing key for the integrated circuit from the non-volatile memory; and
   providing the hardware revision indicator, the indication of life cycle state, and the silicon manufacturing key to the key manager of the integrated circuit to generate the silicon-specific root key.

3. The method of claim 1, wherein obtaining the security descriptor of the second code comprises one of:
   generating a digest of the second code of the ROM extension image, the digest useable as the security descriptor of the second code; or
   retrieving, from a manifest of the ROM extension image, a software binding value that is useable as the security descriptor of the second code.

4. The method of claim 1, further comprising:
   retrieving an identity diversification value from logic circuitry of the integrated circuit;
   providing the identity diversification value to the key manager; and
   receiving, from the key manager, a silicon-specific identity key generated based on at least the identity diversity value and the silicon-specific root key.

5. The method of claim 4, further comprising:
   storing the silicon-specific identity key into a key storage register of the integrated circuit; and
      using the silicon-specific identity key to authenticate the first code; or
      using the silicon-specific identity key to authenticate the second code.

6. The method of claim 1, wherein the public key comprises a first public key provided by a designer of the integrated circuit and the method further comprises:
  initiating execution of the second code of the ROM extension image stored in the non-volatile memory of the integrated circuit;
  in response to the execution of the second code:
    retrieving a second public key from a boot information page of a bootloader image stored in the non-volatile memory of the integrated circuit, the second public key provided by a system integrator of the integrated circuit;
    verifying, based on the second public key retrieved from the boot info page, a digest of third code of the bootloader image stored in the non-volatile memory;
    obtaining a digest of the third code from a bootloader manifest;
    validating, based on a comparison of the digest of the third code of the bootloader image and the digest of the third code from the bootloader manifest, the digest of the third code of the bootloader image;
  responsive to validating the digest of third code of the bootloader image, retrieving a software binding value from the bootloader manifest;
    providing the silicon-specific root key and the software binding value from the bootloader manifest to the key manager of the integrated circuit to generate a device-specific intermediate key; and
  responsive to verifying the digest of the third code of the bootloader image and successful generation of the device-specific intermediate key, transferring execution from the second code to the third code of the bootloader image.

7. The method of claim 6, further comprising:
  retrieving a device-specific root secret from the non-volatile memory; and
  providing the device-specific root secret to the key manager to generate the device-specific intermediate key.

8. The method of claim 6, further comprising:
  retrieving an additional identity diversification value from logic circuitry of the integrated circuit;
  providing the additional identity diversification value to the key manager;
  receiving, from the key manager, a device-specific identity key generated based on the additional identity diversity value and the device-specific intermediate key;
  storing the device-specific identity key into a key storage register of the integrated circuit; and
  using the device-specific identity key to authenticate the third code of the bootloader image.

9. The method of claim 6, further comprising:
  initiating execution of the third code of the bootloader image stored in the non-volatile memory of the integrated circuit;
  in response to the execution of the third code:
    verifying, based on the second public key, a digest of fourth code of a kernel image stored in the non-volatile memory of the integrated circuit;
    obtaining a digest of the fourth code from a kernel manifest;
    validating, based on a comparison of the digest of the fourth code of the kernel image and the digest of the fourth code from the kernel manifest, the digest of the fourth code of the kernel image;
  responsive to validating the digest of fourth code from the kernel image, retrieving a software binding value from the kernel manifest;
    providing the device-specific intermediate key and the software binding value from the kernel manifest to the key manager of the integrated circuit to generate a device-specific root key; and
  responsive to verifying the digest of the fourth code of the kernel image and successful generation of the device-specific root key, transferring execution from the third code to the fourth code of the kernel image.

10. The method of claim 9, further comprising:
  initiating execution of the fourth code of the kernel image; and
  in response to the execution of the fourth code:
  generating, based on the device-specific root key, a version key for use by a kernel implemented by execution of fourth code of the kernel image or applications associated with the kernel image.

11. A system-on-chip (SoC) comprising:
  a boot read-only memory (ROM) storing first code;
  a non-volatile memory storing a ROM extension image of second code;
  a key manager configured to generate identity keys and root keys for the SoC; and
  a processor configured to execute processor-executable instructions to implement a boot process for a device in which the SoC is embodied, the boot process comprising:
  initiating execution of the first code of the boot ROM of the SoC;
  in response to the execution of the first code:
    retrieving a public key from the ROM;
    verifying, based on the public key, a digest of second code of the ROM extension image stored in the non-volatile memory of the SoC;
    retrieving a root key from one-time programmable (OTP) memory of the SoC;
    retrieving a device identifier from the OTP memory of the SoC;
    obtaining a security descriptor of the second code of the ROM extension image; and
    providing the root key, the device identifier, and the security descriptor of the second code to the key manager of the SoC to generate a silicon-specific root key; and
  responsive to verifying the digest of the second code and successful generation of the silicon-specific root key, transferring execution of the boot process from the first code to the second code of the ROM extension image.

12. The SoC of claim 11, wherein the boot process further comprises in response to the execution of the first code:
  retrieving a hardware revision indicator from logic circuitry of the SoC;
  receiving, via a data bus, an indication of a life cycle state of the SoC;
  retrieving a silicon manufacturing key for the SoC from the non-volatile memory; and
  providing the hardware revision indicator, the indication of life cycle state, and the silicon manufacturing key to the key manager of the SoC to generate the silicon-specific root key.

13. The SoC of claim 11, wherein obtaining the security descriptor of the second code comprises one of:
  generating a digest of the second code of the ROM extension image, the digest useable as the security descriptor of the second code; or retrieving, from a manifest of the ROM extension image, a software binding value that is useable as the security descriptor of the second code.

14. The SoC of claim 11, wherein the boot process further comprises:
retrieving an identity diversification value from logic circuitry of the SoC;
providing the identity diversification value to the key manager; and
receiving, from the key manager, a silicon-specific identity key generated based on the identity diversity value and the silicon-specific root key.

15. The SoC of claim 14, wherein the boot process further comprises:
storing the silicon-specific identity key into a key storage register of the SoC; and
using the silicon-specific identity key to authenticate the first code; or
using the silicon-specific identity key to authenticate the second code.

16. The SoC of claim 11, further comprising:
a bootloader image including third code stored in the non-volatile memory, and wherein the public key comprises a first public key provided by a designer of the integrated circuit and the boot process further comprises:
initiating execution of the second code from the ROM extension image stored in the non-volatile memory of the SoC;
in response to the execution of the second code:
retrieving a second public key from a boot information page of the bootloader image stored in the non-volatile memory, the second public key provided by a system integrator of the SoC;
verifying, based on the second public key from the boot information page, a digest of the third code of the bootloader image stored in the non-volatile memory;
obtaining a digest of third code from a bootloader manifest;
validating, based on a comparison of the digest of the third code of the bootloader image and the digest of third code from the bootloader manifest, the digest of the third code of the bootloader image;
responsive to validating the digest of third code of the bootloader image, retrieving a software binding value from the bootloader manifest;
providing the silicon-specific root key and the software binding value from the bootloader manifest to the key manager of the SoC to generate a device-specific intermediate key; and
responsive to verifying the digest of the third code of the bootloader image and successful generation of the device-specific intermediate key, transferring execution of the boot process from the second code to the third code of the bootloader image.

17. The SoC of claim 16, wherein the boot process further comprises:
retrieving a device-specific root secret from the non-volatile memory of the SoC; and
providing the device-specific root secret to the key manager to generate the device-specific intermediate key.

18. The SoC of claim 16, wherein the boot process further comprises:
retrieving an additional identity diversification value from logic circuitry of the SoC;
providing the additional identity diversification value to the key manager;
receiving, from the key manager, a device-specific identity key generated based on the additional identity diversity value and the device-specific intermediate key;
storing the device-specific identity key into a key storage register of the SoC; and
using the device-specific identity key to authenticate the third code of the bootloader image.

19. The SoC of claim 16, further comprising:
a kernel image including fourth code stored in the non-volatile memory; and
wherein the boot process further comprises:
initiating execution of the third code of the bootloader image stored in the non-volatile memory of the SoC;
in response to the execution of the third code:
verifying, based on the second public key, a digest of the fourth code of the kernel image stored in the non-volatile memory of the SoC;
obtaining a digest of fourth code from a kernel manifest;
validating, based on a comparison of the digest of the fourth code of the kernel image and the digest of the fourth code from the kernel manifest, the digest of the fourth code of the kernel image;
responsive to validating the digest of fourth code of the kernel image, retrieving a software binding value from the kernel manifest;
providing the device-specific intermediate key and the software binding value from the kernel manifest to the key manager of the SoC to generate a device-specific root key; and
responsive to verifying the digest of the fourth code from the kernel image and successful generation of the device-specific root key, transferring execution of the boot process from the third code to the fourth code.

20. The SoC of claim 19, wherein the boot process further comprises:
initiating execution of the fourth code of the kernel image stored in the non-volatile memory; and
in response to the execution of the fourth code:
generating, based on the device-specific root key, a version key for use by a kernel implemented by execution of fourth code of the kernel image or applications associated with the kernel image.

* * * * *